United States Patent
Waldrop

US006514922B2

(10) Patent No.: US 6,514,922 B2
(45) Date of Patent: Feb. 4, 2003

(54) GEL PURGE FORMULATIONS AND METHODS OF CLEANING EXTRUDERS BY USING THE SAME

(75) Inventor: Mark W. Waldrop, Royal Oak, MI (US)

(73) Assignee: BASF Corporation, Mount Olive, NJ (US)

( * ) Notice: Subject to any disclaimer, the term of this patent is extended or adjusted under 35 U.S.C. 154(b) by 0 days.

(21) Appl. No.: 10/131,135

(22) Filed: Apr. 25, 2002

(65) Prior Publication Data

US 2002/0187913 A1 Dec. 12, 2002

Related U.S. Application Data

(62) Division of application No. 09/874,372, filed on Jun. 6, 2001.

(51) Int. Cl.[7] .............................. C11D 3/18; C11D 3/20; C11D 3/26
(52) U.S. Cl. ................ 510/188; 510/166; 510/170; 510/245; 510/264; 510/499; 510/403
(58) Field of Search ................................. 510/166, 170, 510/188, 245, 254, 264, 499, 403

(56) References Cited

U.S. PATENT DOCUMENTS

| | | | |
|---|---|---|---|
| 5,139,694 A | 8/1992 | Kmiec | |
| 5,236,514 A | 8/1993 | Leung et al. | |
| 5,739,460 A | 4/1998 | Knowlton et al. | |
| 6,001,188 A | 12/1999 | Walsh et al. | |
| 6,228,827 B1 * | 5/2001 | Penninger et al. | 510/320 |
| 6,309,655 B1 * | 10/2001 | Minnix | 424/401 |
| 6,342,473 B1 * | 1/2002 | Kott et al. | 510/357 |
| 6,436,885 B2 * | 8/2002 | Biedermann et al. | 510/131 |

* cited by examiner

*Primary Examiner*—Gregory Delcotto
(74) *Attorney, Agent, or Firm*—Nixon & Vanderhye P.C.

(57) ABSTRACT

Methods for cleaning screw extruder, especially powder-coating extruders, include filling the extruder barrel with a gel purge formulation comprised of a high-boiling pyrrolidone or piperidone (lactam) solvent (most preferably N-methyl pyrrolidone (NMP)), thickened with 5–50 wt. % of a thermoplastic resin thickening agent, most preferably polystyrene (PS). Once the extruder barrel is filled with the gel purge formulation, the screws are stopped and the gel allowed to soak for between about 10 to about 30 minutes. The screws are then restarted and the gel is discharged from the extruder. Immediately after the gel purge formulation exits the machine, a small amount of a thermoplastic "rinse" polymer (e.g., polyethylene) may be added so as to remove any vestigial amount of the gel purge formulation therefrom.

11 Claims, No Drawings

GEL PURGE FORMULATIONS AND METHODS OF CLEANING EXTRUDERS BY USING THE SAME

This application is a division of application Ser. No. 09/874,372, filed Jun. 6, 2001, now pending, the entire content of which is hereby incorporated by reference in this application.

FIELD OF THE INVENTION

The present invention generally relates to cleaning of screw extruders. More particularly, the present invention relates to the cleaning of screw extruders by introducing a cleaning compound within and through the screw extruder barrel to thereby clean the same.

BACKGROUND AND SUMMARY OF THE INVENTION

The use of powder coatings for decorative purposes has grown dramatically primarily due to their environmental advantages over liquid coatings. For example, powder coatings do not contain volatile organic solvents that evaporate during application or curing. Expensive, conditioned air from powder paint booths is recycled rather than exhausted because it does not contain solvent vapor—saving energy. Because it contains no solvent, less air has to be exhausted from powder coating drying ovens, saving additional energy. Finally, powder coating overspray is easily captured and recycled without the use of a water-wash system. As a result, there is no paint sludge from booth wash water to landfill. However, in the manufacturing process, liquid coatings do have one key advantage over powder coatings: if a batch of liquid paint is found to be slightly off-color, its color can be adjusted by mixing in additional pigments until the correct color is obtained. In the case of powder coatings, off-spec batches of coating powder have to be scrapped. Often, the reason that batches of coating powder become discolored, or otherwise contaminated, is poor cleaning of the extrusion equipment used to make them.

Thermosetting coating powders are made by first blending the resin and curing agent with up to six other dry ingredients such as colorants, catalysts, flow control additives, fillers, or UV stabilizers in a batch mixer such as a Henschel mixer. This premix is then melt compounded in a single- or twin-screw extruder of the types made by Werner-Pfleiderer, APV Baker, B&P Process Equipment, or Buss. In the extruder, the resin melts, the ingredients are compacted, and the constituents are completely dispersed in the molten resin. The extruder generates enough heat through mechanical shear that little external heating is required to melt the resin. The melt temperatures for mixtures of thermosetting materials can be as high as 180° C., but they typically operate at temperatures from about 60 to about 40° C., only slightly above the melting temperature of the resin. Residence time in the extruder is also short, normally a minute or less. Due to the low processing temperatures and short residence time, little reaction occurs between the resin and curing agents (normally, less than about 5%). As the melt exits the extruder, it is cooled rapidly on a water-cooled drum and then passed to a water-cooled belt. The cooled compound is broken into granules approximately 0.5 in. by 0.5 in. The friable granules are then ground in a hammer mill to a fine particle size, typically 75 $\mu$m or less. The fine particles are screened in a classifier before final packaging.

Normally, one such manufacturing line will produce multiple types of coating powders based on epoxy, polyester, polyurethane, acrylic, or hybrid resins. A line will also produce multiple colors of the various coating powders. Before a manufacturing line can switch from producing one color or resin to another, the entire system must be cleaned to prevent contamination of subsequent batches. By far, the most difficult equipment to clean, or purge, in the manufacturing system is the extruder.

The extruder consists of a barrel and one or more (typically two) screws containing specially designed flights known as feed, transition, mixing, dispersion, and metering "zones". The screws convey and thoroughly mix the ingredients of the melt through the externally heated barrel and then meter the melt through a die and onto the cooling drum. As mentioned, the temperatures along the barrel are kept only slightly above the melt temperature of the resin, and in some sections, such as the feed section, there is no external heating. However, invariably, some of the ingredients of the coating powder adhere to the barrel, the die, or a section of the screw, leaving particularly tough, abrasion-resistant residue. This abrasion-resistant residue is particularly prevalent in sections that contain scratches or pits. Such residue can contaminate, and even ruin, later batches with a different color it is not completely purged. If the residue remains in the extruder long enough, it can also cross-link and become harder with each batch or eventually degrade into carbon deposits. Highly cross-linked, hardened material that falls off in later batches can sometimes be screened out in classifying equipment because of its larger particle size. However, the classifying equipment has to be operated very slowly, increasing production time and processing costs.

Currently, a few methods of cleaning powder-coating extruders are employed. One method is to disassemble the extruder and clean the screws by sandblasting them and then burning off the remaining residue with a blowtorch. This process normally lasts a little over an hour, but can take up to 6 hours, to complete. The other major drawback of the process is heating the screws. The blowtorch heats the screws in spots to temperatures greater than about 800° F., causing them to become brittle over time. The screws can eventually bend and break. Residue can also be burned off of the screws in a burn-off oven without sandblasting. The screws have to be heated to temperatures above 600° F. for several hours, again shortening their service life. In addition to the degradation caused by heating, there is also the danger of a screw being dropped or chipped by the one or two people who have to disassemble the extruder to remove them. Since one screw on a 65-mm extruder with a ratio of length to diameter (i.e., L:D ratio) of about 15:1 can be quite costly, disassembling the extruder and heating the screws can be too expensive to be a viable cleaning method.

Another method of cleaning the extruder is to disassemble it and immerse the screws in a bath of hot caustic. With time, the hot caustic chemically degrades and breaks up the residue. This is an undesirable method because of the excessive downtime needed to disassemble the extruder and the safety considerations associated with working with hot caustic.

Several commercial cleaning, or "purge", compounds are used to clean thermoplastic processing equipment such as extruders and injection molding machines. They have also been tried on powder coating extruders. These purge compounds are typically solid thermoplastic carrier resins in pellet, granule, or powder form that contain surface-active agents, abrasive fillers, occasionally amine compounds such as monoethanolamine, or other cleaning agents. Typical thermoplastic carrier resins include acrylic, polyethylene, polypropylene, polystyrene, and styrenic resins such as acrylonitrile-butadiene-styrene (ABS) and styrene-acrylonitrile (SAN). Abrasive fillers include hard acrylic resins, glass fibers, calcium carbonate, mica, aluminum oxide, kaolin, and ceramic spheres. Surface-active agents and other cleaning agents include polyalkylene oxide-based polyol surfactants, neutral salts of alkylbenzenesulfonic acid, and polyethylene and fatty acid amide waxes. Processing equipment does not have to be shut down and disassembled to be cleaned with these thermoplastic purge compounds. The purge compounds are fed to the thermoplastic extruders and injection molding machines in the same manner as production resins, with two differences: they are often fed at a slower rate to allow them to scrape residue, and at times, the screws are stopped and the purge compounds allowed to soak. They are relatively effective at removing thermoplastic residues.

However, these dry, solid thermoplastic purge compounds are normally not effective for purging thermosetting coating powder residues for a few reasons. First, the thermoplastic purge compounds—particularly those containing acrylic resins—have to be processed at higher temperatures (>200° C.) than those normally used in powder coating extruders (60–140° C.). The higher temperatures cause the coating powder residues to cross-link further, making them even more difficult to remove. Second, most of the thermoplastic purge compounds clean by mechanically scraping the screw and barrel. This purely physical, abrasive cleaning is normally insufficient to remove the more tenacious, abrasion-resistant thermosetting coating powder resins. Third, the feed section of powder coating extruders is not heated. This prevents the solid purge compounds from melting which they need to do in order to clean; as a result, the thermoplastic purges are ineffective in the feed section.

Thermoplastic processing equipment is also cleaned effectively by another type of solid, non-tacky purge compound taught by U.S. Pat. No. 6,001,188 to Walsh. This compound comprises thermoplastic beads or pellets that contain from 3–17% of an alkyl or alkoxy-substituted pyrrolidone, such as N-methyl pyrrolidone (NMP). These purge pellets are fed to extruders in the same manner production resins, eliminating the need for equipment disassembly. Temperatures of between about 180 to about 300° C. must be maintained in all zones of the extruder in order for the pellets to clean. The pellets clean thermoplastic resins quite well. However, it has been found that these pellets do not purge thermosetting coating powders as effectively, possibly as a result of the lower processing temperatures used in powder coating extruders (typically between about 60 to about 140° C.). This purge material leaves thermosetting coating powder residue in the dispersion, transition, and metering zones of extruder screws. In addition, the purge pellets do not melt and clean the feed zones at all because the feed zones are not heated.

Liquids have been tried for cleaning powder coating extruders, such as water-based purge materials. These materials have the disadvantage that they are not "pumped" by the screw through the extruder barrel because of their low viscosity (the extruders are designed to pump high-viscosity polymer melts). As a result, these purges do not mix intimately with the coating powder residue and are ineffective. Organic solvents such as methylene chloride, acetone, and isopropyl alcohol (IPA) have also been tried as purge materials. Like the water purges, these liquids also tend to flow through the barrel without filling it and mixing completely with residues. In addition, there are serious toxicity, air pollution, and hazardous waste concerns associated with methylene chloride. Polymer pellets can be added simultaneously to extruders with acetone and IPA to enhance their contact with the screw and barrel wall and to help slow them from running out the die. However, they still tend to flow through the extruder and evaporate without contacting the coating powder residues sufficiently.

There is a need for a cleaning agent to clean powder coating extruders that does not require disassembling the equipment; that chemically solvates rather than mechanically scraping, the crosslinked, tenacious, abrasion-resistant coating powder residues; that does not contain hazardous ingredients; that is effective and does not evaporate at the temperatures used in powder coating extruders; that does not leave incompatible residues; and that is viscous enough to be pumped by the extruder screw yet thin enough to contact all areas of the screw, including the feed section. The compound should further be heat-stable and should not leave residues that are difficult to purge.

The invention is embodied broadly in gel purge formulations and in methods for cleaning extruders, especially powder-coating extruders, using such gel formulations. Most preferably, the gel purge formulations of the present invention includes a high-boiling pyrrolidone or piperidone (lactam) solvent (most preferably N-methyl pyrrolidone (NMP)), in which there is dissolved between about 5 to about 50 wt. % of a thermoplastic resin thickening agent, most preferably polystyrene (PS). The thickened gel purge formulation is sufficiently viscous at extruder operating temperatures of from about 60 to about 140° C. to be pumped by the extruder screws and to fill the voids and cavities inside the barrel without gushing through the die.

The thickened gel formulations of the present invention may thus be poured directly into the feed section of the extruder (i.e., no disassembly is required) at standard operating extruder temperatures of from about 100 to about 120° C. and pumped by the extruder screws until it fills the barrel. Once the barrel is filled with the gel formulation, the screws are stopped and the gel allowed to soak for between about 10 to about 30 minutes. The screws are then restarted and the gel is discharged from the extruder.

A small amount of the lactam solvent is usually lost from the gel formulation due to evaporation during the "soaking" and emptying processes. As the lactam solvent evaporates, however, the thermoplastic resin thickening agent becomes somewhat harder because it is slightly below its normal processing temperature. This feature of the gel formulations according to the present invention thereby assists in scrubbing the thermosetting residues within the extruder barrel with additional lactam solvent as the gel formulation is discharged from the extruder.

Immediately after discharge of the gel purge formulation from the extruder barrel, it is preferred that a small amount of particulate thermoplastic material (e.g., polyethylene pellets) is added to the extruder as a follower resin to force out, or "rinse" any remaining residue of the gel formulation from the extruder barrel. Since the rinse thermoplastic resin is only partially melted or softened, it will retain a putty-like consistency which aids in pushing any remaining vestiges of gel purge formulation from the barrel. This final "rinse" step is made easier by the slight hardening of the thickening agent due to the small, but meaningful, evaporation of the lactam solvent as described briefly above.

These and other aspects and advantages of the present invention will become more clear after careful consideration is given to the following detailed description of the preferred exemplary embodiments thereof which follow.

DETAILED DESCRIPTION OF THE INVENTION

The gel purge formulations of the present invention will necessarily include a lactam solvent and a thermoplastic resin thickening agent. Examples of lactam solvents that may be employed in the practice of the present invention include pyrrolidone and piperidone solvents, which may or may not be substituted. Preferred lactam solvents include, for example, N-methyl pyrrolidone, N-hydroxyethyl pyrrolidone, N-cyclohexyl pyrrolidone, N-ethyl pyrrolidone, 1,5-dimethyl piperidone, 1,3-dimethyl piperidone, and mixtures thereof. Most preferably, the preferred solvent is N-methyl pyrrolidone (NMP).

The thickening agent used to make the pellets is a thermoplastic resin that is solvated by the lactam solvent described above. Examples of suitable thermoplastic resins that may be employed for such purpose include polystyrene, polyvinyl chloride (PVC), acrylonitrile/butadiene/styrene (ABS), styrene/acrylonitrile (SAN), methacrylate/acrylonitrile/butadiene/styrene (MABS), polycarbonates, and thermoplastic polyurethanes. The preferred thermoplastic resin thickeners are polystyrene and polyvinyl chloride. The thermoplastic resin can be virgin resin purchased directly from a manufacturer, or it can be post-industrial or post-consumer scrap resin (e.g., recycled resin pellets, granules, or powder; or resin obtained from grinding or shredding plastic parts). Both types of resin have the advantage of being inexpensive, particularly the scrap resin.

Thermoplastic resins are particularly advantageous for use as thickening agents in a gel purge compound for cleaning powder coating extruders for several reasons: they are inexpensive, especially relative to the thickeners used by formulators of solvent blends such as cellulosic materials, precipitated and fumed silicas, and clays. They are mildly abrasive because the processing temperatures in powder extruders are below the temperatures normally used to process thermoplastics. They are thermally stable at the temperatures used in powder coating extruders, so they do not leave additional residue behind. They allow for the formation of a gel that is easily fed into the extruder yet sufficiently viscous to not gush from the extruder die. Furthermore, they are easily processed and pumped by the extruder screws.

The gel purge formulations of the present invention are most preferably made by dissolving the thermoplastic resin thickening agent in the lactam solvent. In this regard, the thermoplastic resin thickening agent can most conveniently be poured into the lactam solvent and allowed to dissolve therein. For example, plastic parts can be shredded and the shredded resin allowed to fall into the lactam solvent. Alternatively, the resin can be mixed into the lactam solvent with a high-shear mixer to dissolve it at a faster rate. Suitable mixers for such purpose include, for example, standard marine and paddle impellers, helical impellers, plow mixers, Brabender-type mixers, and the like. The resin can be mixed with the lactam solvent at room temperature (i.e., about 25° C.), or the lactam solvent can be heated to dissolve the resin more quickly, with the optimum elevated temperature for such mixing being between about 70 to about 135° C.

Sufficient thermoplastic resin should be added to the NMP to create a viscous gel that is pourable at room temperature. Most preferably, the viscosity of the gel purge formulations according to the present invention will be at least about 100 cP, and more preferably, at least about 300 cP, as measured at 25° C. Typically, the viscosity of the gel purge formulations according to the present invention will be less than about 1000 cP, and preferably less than about 750 cP, as measured at 25° C. Some particularly preferred gel purge formulations according to the present invention will exhibit a viscosity (as measured at 25° C.) of about 500 cP.

The amount of the thermoplastic resin required depends on the type of resin that is employed. For example, 20–30 wt. % polystyrene is required to thicken NMP to an optimum viscosity, while only 15–20 wt. % polyvinyl chloride (PVC) may be required. In general, the thermoplastic resin should comprise between about 5 to about 60 wt. % of the gel formulation, and preferably between about 10 to about 50 wt. % of the gel formulation. Most preferably, the thermoplastic resin will be present in an amount between about 15 to about 40 wt. % of the gel formulation.

The thermoplastic resin should not, however, be employed in excess amounts, that is, all of the resin employed should dissolve completely in the lactam solvent. The amount of time required to dissolve the resin will vary depending on the type of resin, the amount of resin added, the size of the resin particulates (e.g., powder dissolves faster than relatively larger-sized pellets), the temperature of the lactam solvent, and the amount and type of mechanical mixing that is employed.

Cleaning extruders employing the gel purge formulations of the present invention is accomplished by substantially filling the extruder barrel to be cleaned while maintaining the barrel temperature between about 60 to about 140° C., and more preferably between about 100 to about 120° C. The gel formulation is allowed to reside in the heated extruder barrel for a time sufficient to permit some evaporation of the lactam solvent which, in turn, hardens the thermoplastic thickening agent somewhat.

Once a desired amount of residence, or "soaking" time has elapsed (typically between about 10 to about 30 minutes), the gel formulation is discharged from the extruder by operating the extruder screw. A thermoplastic "rinse" polymer (e.g., a polyolefin, such as polyethylene) may then be processed through the heated extruder so as to remove vestigial amounts of the gel purge formulation that may remain in the extruder barrel. The thermoplastic rinse polymer most preferably has a melt temperature which is sufficiently high such that, at the extruder operating temperature during the cleaning cycle, the rinse polymer does not melt entirely, but instead is only partially melted so that it remains as a putty-like substance to thereby aid in the cleaning/rinsing process.

The screw extruder must, of course, initially be emptied of any powder coating material as completely as possible before the gel purge formulation is introduced, while maintaining the barrel temperature to within the range noted previously. If the barrel temperature is below 110° C., however, it is preferred that it be increased to 120° C. since the preferred temperature of the extruder barrel during cleaning with the gel purge compound is most preferably between about 110 to about 120° C. However, the gel purge formulation will still clean the extruder barrel at temperatures as low as 60° C., even though more time and more gel are required to clean at such lower barrel temperatures. The gel is also effective at higher temperatures, up to about 180° C.

The gel purge formulation is most preferably fed into the extruder barrel by slowly pouring it into the feed section of the screws—that is, through the same port that is typically used to add solid additives to a thermoplastic polymer melt. The gel purge formulation is poured into the extruder until it emerges from the extruder die head, indicating that the barrel has been filled. At that time the extruder screw (or screws if a multiple screw extruder is being cleaned) is stopped to allow the gel purge formulation to "soak" for between about 10 to about 30 (preferably between about 10 to about 20) minutes, depending on the last resin processed and the amount of built-up residue thereof in the barrel. The extruder barrel temperature is most preferably maintained during this undisturbed residence or "soaking" time of about 120° C.

Following the "soak" period by the gel purge compound, the extruder is then operated so as to empty the barrel of the gel purge compound. Most preferably, the extruder barrel temperature for all zones is reduced to about 80° C. once the barrel has been emptied of the gel purge formulation. As noted previously, a thermoplastic "rinse" resin may then be added to the extruder so as to remove any remaining amount of the gel purge formulation therefrom.

The present invention will be further understood from the following non-limiting Examples.

EXAMPLE 1

Making a Gel Purge Compound Thickened with Polystyrene

Four 55-gallon drums of N-methyl pyrrolidone (462 lb./drum×4 drum=1848 lb. NMP) were charged to a 300-gallon reactor fitted with an agitator with a pitched-blade turbine impeller. The agitator was turned on and approximately 600 lb. of Polystyrene 158K general purpose polystyrene pellets from BASF Corporation were fed into the reactor. The NMP and polystyrene were allowed to mix at room temperature until the polystyrene pellets were completely dissolved. The tank was checked after 7 hours of mixing. The mixture was then drained into 55-gallon drums.

EXAMPLE 2

Making a Gel Purge Formulation Thickened with Polyvinyl Chloride

Approximately 7.25 lb. of N-methyl pyrrolidone (NMP) were added to a 1-gallon plastic container. Approximately 1.3 lb. of PVC Resin 191 from Geon Corporation were added to the NMP at room temperature (approximately 25° C.). The NMP was mixed with a laboratory mixer until the PVC was completely dissolved.

EXAMPLE 3

Cleaning with the Gel Purge Formulation

A 40 -mm twin screw production extruder from APV Baker was used. A brown urethane-based coating powder was processed in the extruder for approximately 8 hours at 120° C. prior to its being cleaned. A gel purge compound consisting of 20 wt. % polystyrene and 80 wt. % NMP was added to the extruder until it filled the barrel. The screws were stopped and the NMP gel purge allowed to soak for 30 minutes at 60° C. The screws were then started and the gel purge emptied. The purge material was a dark brown color. A second quantity of the 20 wt. % PS/80 wt. % NMP gel purge was added to the extruder until it filled the barrel. The screws were stopped again and the gel allowed to soak for another 30 minutes at 60° C. This material was then emptied from the barrel and the temperature was increased to 77° C. A few ounces of polyethylene pellets were then fed through the extruder to "rinse" any remaining gel purge compound.

The feed, mixing, and metering sections of the screw were observed to be clean. Small amounts of brown residue remained in the transition and dispersion zones of the screw.

EXAMPLE 4

Cleaning with the Gel Purge Formulation

A 19-mm twin screw, laboratory extruder from Werner-Pfleiderer was used. A particularly difficult-to-clean red, urethane-based coating powder was processed for 30 minutes at 200° C., a higher temperature than normally used, so as to essentially bake the ingredients of the coating powder on the screws and barrel. The red coating powder was emptied from the extruder. A gel purge compound consisting of 20 wt. % PS and 80 wt. % NMP was added to the extruder until it filled the barrel. The screws were then stopped and the NMP gel purge allowed to soak for 15 minutes at 80° C. The screws were started and the gel purge emptied. The purge material was a dark red color as it exited the die. The barrel was again filled with a second quantity of 20-wt. % PS/80-wt. % NMP gel purge. The gel was allowed to soak for another 15 minutes at 80° C. This second quantity of gel purge material was then emptied from the barrel, and about 5 ounces of polyethylene pellets were fed through the extruder to "rinse" any remaining gel purge compound.

The feed and mixing sections of the screw were observed to be clean. Small amounts of red residue remained in the transition and dispersion zones of the screw.

EXAMPLE 5

Cleaning with the Gel Purge Formulation

A 19-mm twin screw, laboratory extruder from Werner-Pfleiderer was used A particularly difficult-to-clean red, urethane-based coating powder was processed for 15 minutes at 175° C., a higher temperature than normally used, so as to bake the ingredients of the coating powder on the screws and barrel. The red coating powder was emptied from the extruder. A gel purge compound consisting of 20 wt. % PS and 80 wt. % NMP was added to the extruder until it filled the barrel. The screws were stopped and the NMP gel purge allowed to soak for 10 minutes at 120° C. The screws were then started and the gel purge emptied. The purge material was a dark red color. The barrel was again filled with a second quantity of 20-wt. % P5180-wt. % NMP gel purge. The gel was allowed to soak for another 10 minutes at 120° C. This second quantity of gel purge material was then emptied from the barrel, and several ounces of polyethylene pellets were fed through the extruder to rinse any remaining gel purge compound.

The feed, mixing, metering, and transition zones of the screws were observed to be clean. The dispersion zone was also clean, with only a small particle remaining on the screw.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gel purge formulation for cleaning screw extruders comprising a lactam solvent, and an amount of a thermoplastic resin thickening agent dissolved in said lactam solvent sufficient to form a viscous gel.

2. The gel purge formulation of claim 1, having a viscosity of at least about 100 cP at 25° C.

3. The gel purge formulation of claim 1, having a viscosity of at least about 300 cP at 25° C.

4. The gel purge formulation of claim 1, wherein the thermoplastic resin thickening agent is present in an amount between about 5 to about 50 wt. %.

5. The gel purge formulation of claim 4 wherein the lactam solvent is a pyrrolidone or a piperidone.

6. The gel purge formulation of claim 5, wherein the lactam solvent is at least one selected from the group consisting of N-methyl pyrrolidone, N-hydroxyethyl pyrrolidone, N-cyclohexyl pyrrolidone, N-ethyl pyrrolidone, 1,5-dimethyl piperidone, and 1,3-dimethyl piperidone.

7. The gel purge formulation of claim 1, wherein the lactam solvent is N-methyl pyrrolidone.

8. The gel purge formulation of claim 7, wherein the thermoplastic resin thickening agent is polystyrene.

9. The gel purge formulation of claim 1, wherein the thermoplastic resin thickening agent is at least one selected from the group consisting of polystyrene, polyvinyl chloride (PVC), acrylonitrile/butadiene/styrene (ABS), styrene/acrylonitrile (SAN), methacrylate/acrylonitrile/butadiene/styrene (MABS), polycarbonates, and thermoplastic polyurethanes.

10. A gel purge formulation for cleaning screw extruders consisting essentially of N-methyl pyrrolidone (NMP) in an amount 50 to about 95 wt. %, and polystyrene dissolved in said NMP in an amount between about 5 to about 50 wt. % sufficient to achieve a viscosity of the gel purge formulation of at least about 100 cP at 25° C.

11. A gel purge formulation which consists essentially of about 80 wt. % of N-methyl pyrrolidone and about 20% wt. % polystyrene.

* * * * *